United States Patent [19]

Mino et al.

[11] Patent Number: 5,265,523
[45] Date of Patent: Nov. 30, 1993

[54] HEATING EQUIPMENT FOR COLD FOODSTUFFS

[75] Inventors: Hirofumi Mino; Shintaro Kiyomitsu, both of Kawasaki, Japan

[73] Assignee: Fuji Electric Co., Ltd., Kawasaki, Japan

[21] Appl. No.: 46,202

[22] Filed: Apr. 14, 1993

[30] Foreign Application Priority Data

Apr. 27, 1992 [JP] Japan ................... 4-107113
Sep. 1, 1992 [JP] Japan ................... 4-232514

[51] Int. Cl.⁵ .......................... A23L 3/10; A47J 27/10
[52] U.S. Cl. .............................. 99/367; 99/403; 99/416; 99/450; 99/483
[58] Field of Search ............ 99/330, 359, 367, 370, 99/371, 403, 410, 415–418, 448, 450, 483, 516, 536; 422/292, 294, 295, 300; 126/369, 373; 426/412, 410, 520, 523

[56] References Cited

U.S. PATENT DOCUMENTS

| | | | |
|---|---|---|---|
| 374,909 | 12/1887 | Hopper | 99/416 |
| 3,608,627 | 9/1971 | Shevlin | 99/367 |
| 3,946,654 | 3/1976 | Janssen | 99/359 |
| 4,005,645 | 2/1977 | Janssen | 99/403 |
| 4,169,408 | 10/1979 | Mencacci | 99/359 |
| 4,215,629 | 8/1980 | Janssen | 99/410 |
| 4,412,482 | 11/1983 | Janssen | 99/410 |
| 4,499,817 | 2/1985 | Janssen | 99/403 |
| 4,502,374 | 3/1985 | Davis | 99/450 |
| 4,739,699 | 4/1988 | Nelson et al. | 99/483 |
| 4,873,919 | 10/1989 | Janssen | 99/403 |

Primary Examiner—Timothy F. Simone
Attorney, Agent, or Firm—Brumbaugh, Graves, Donohue & Raymond

[57] ABSTRACT

An apparatus for heating foodstuffs contained in packages of parallelopiped shape which includes a container for a heating medium, a placing table disposed inside the container, and a heater for heating the heating medium. The placing table has rectangular cylindrical elements between which the foodstuffs are placed. The faces of the rectangular cylindrical elements which face the foodstuffs on either side are roughly the same size as the faces of the foodstuffs which face the rectangular cylindrical elements and have discharge holes to facilitate the flow of the heating medium. The heated heating medium is circulated from below the placing table, up through the placing table, out through the discharge holes of the cylindrical elements and into contact with the packages, thus providing for quick and efficient heating of the foodstuffs.

9 Claims, 4 Drawing Sheets 5,265,523

HEATING EQUIPMENT FOR COLD FOODSTUFFS

BACKGROUND OF THE INVENTION

The present invention relates to equipment for heating chilled or frozen foods so that they can be served.

Restaurants can now serve dishes quickly by refrigerating or freezing ready-to-eat food and heating the food when an order is received from the customer. The equipment used to heat cold foodstuffs by applying conventional technologies used for serving dishes to fit the above pattern include those shown in FIGS. 3 through 5, for example. FIG. 3 is a lateral cross section of conventional heating equipment for cold foodstuffs, FIG. 4 is a lateral cross section viewed from the direction of arrow Q in FIG. 3, and FIG. 5 is a perspective view of the placing table used in FIG. 3.

In FIGS. 3 through 5, the container 1 has a bottom 1a and sides 1b, contains heating medium 2, and is covered with a lid (not shown) as required. The placing table 21 consists of a sidewall 22 arranged above the bottom 1a of said container 1 and a support 23 on which to place foodstuffs 3 contained in rectangular parallelopiped containers arranged on top of the sidewall 22; said sidewall 22 being a rectangular parallelopiped cylinder with both ends opened, and furthermore, having throughholes 22b formed on the lower end and making contact with the bottom 1a of the container 1 to circulate the heating medium 2; said support 23 being formed in the shape shown by bending a thin metallic rod material so that foodstuffs can be placed directly on it, and consisting of a placing section 23a arranged horizontally on top of said sidewall 22, an end holding section 23b serving also as a handle formed upright on both ends of the placing section 23a, and a middle holding section 23c formed upright in the middle of said placing section 23a; and the end holding section 23b and the holding section 23c being formed parallel to each other, while the spaces between them are used to place said cold foodstuffs upright 3.

The inductive heating equipment 4 is used to heat the bottom 1a of said container 1 from beneath and consists of inverter equipment 5 that generates high-frequency currents and a coil 6 arranged apart from the container 1 to generate a high-frequency magnetic field at the center of the bottom 1a of said container 1 by receiving a high-frequency current from the inverter equipment 5.

Conventional heating equipment for cold foodstuffs has the construction as described above, wherein to heat the cold foodstuffs 3 rectangular parallelopiped foodstuffs 3 are placed upright with one its faces, the one with the smallest dimension (that is, the side in the direction of the depth) is put into contact with the spaces between the end holding section 23b and the middle holding section 23c o of said placing section 23a on the placing table 21, while water is used as the heating medium 2 and is filled into the container 1 up to a the level where the cold foodstuffs 3 are fully submerged.

The inductive heating equipment 4 is used under this condition to heat the center of the bottom 1a of the container 1. Thus, the water, which is the heating medium 2, is heated starting at the center of the bottom 1a and an upward flow 2a is generated from the center of the bottom 1a in the heated water. This upward flow 2a flows out from the openings on the top of the sidewall 22 on the placing table 21, rises through the container 1, turns to the sides 1b of the container 1 in the area on the top of the heating medium 2, and thereafter flows down along the side 1b, returning to the area near the center of the bottom 1a. That is, heating the center of the bottom 1a of the container 1 produces in the water used as the heating medium 2 a circulating flow 2b consisting of an upward flow 2a and a downward flow.

Since the cold foodstuffs 3 are placed upright with a side face in the direction of the thickness facing downward on the spaces provided on the placing table 21, said upward flow 2a flows through these spaces. Because the upward flow 2a flows through the spaces along the sides of the foodstuffs 3, these foodstuffs 3 are heated by the water 2 to a temperature that is suitable for them. The water, which is used as the heating medium 2 is generally heated to a temperature higher than 90° C.

The heating equipment for cold foodstuffs that uses conventional technology heats the cold foodstuffs 3 as described above. However, because the upward flow 2a generated in the water used as the heating medium 2 flows out from the openings on the top of the sidewall 22, not all of the upward flow necessarily flows near the cold foodstuffs 3. Also, the flow that makes direct contact with the cold foodstuffs 3 in the upward flow 2a flowing near the cold foodstuffs 3 only represents a part of the flow. Therefore, the heat in the water, which is used as the heating medium 2 that is transferred to the cold foodstuffs 3 represents only a small portion of the total heat generated within the heating medium, which creates a problem in that heating the cold foodstuffs 3 takes too much time.

The present invention was intended to solve the above problems resulting from the use of conventional technologies, and is intended to provide heating equipment that can heat cold foodstuffs within a short period of time.

SUMMARY OF THE INVENTION

An improved apparatus for heating foodstuffs contained in packages of parallelopiped shape is disclosed. The apparatus comprises a container having a sidewall and a bottom for containing a fluid heating medium, a box-like placing table supported within and upon the bottom of container, said placing table having sidewalls with openings along their lower edges, a cover plate sealed to the upper edges of said sidewalls and an open end opposite said cover plate and resting upon said container bottom. The cover plate has a plurality of rectangular openings disposed parallel to and spaced from each other a distance sufficient for a foodstuff package to fit therebetween. A like plurality of hollow, elongate cylinders, each having an open first end and a closed second end and a rectangular cross-section corresponding to the shape of the rectangular openings in said cover plate and a length generally corresponding to the length dimension of said foodstuff packages, are supported with vertical orientation with the open end of each sealingly fitted in a respective rectangular opening in said cover plate in communication with the interior of said table. The cylinders define an array of package-receiving spaces equal in number to said plurality less one. Each rectangular side of the rectangular cylinders that faces the rectangular side of another rectangular cylinder has a multiplicity of discharge holes. A heating means disposed beneath said container heats the fluid heating medium causing it to flow upwardly through said plurality of elongate rectangular cylinders, through said discharge holes and into contact with opposite side surfaces of foodstuff packages placed in the spaces defined by said array of rectangular cylinders for heating the same. This direct flow of the heating medium onto the surfaces of the foodstuff package causes the foodstuff to be heated evenly and more quickly than conventional heating equipment in which the flow of the heating medium does not directly heat the entire foodstuff package.

BRIEF DESCRIPTION OF THE DRAWINGS

Other objects, features and advantages of the invention will become apparent, and its construction and operation better understood, from the following detailed description when read in conjunction with the accompanying drawings, in which.

DETAILED DESCRIPTION OF THE PREFERRED EMBODIMENT

Detailed explanations are given on the embodiments of the present invention with reference to the drawings.

Figure 1A:
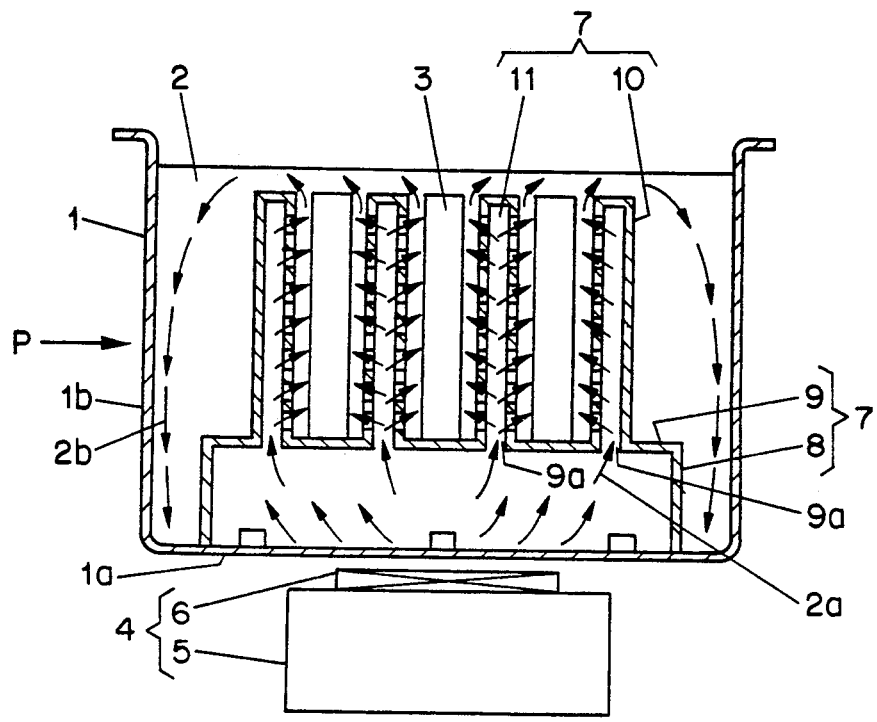
FIG. 1(a) is a lateral cross section of the placing table of one embodiment of the invention.
Figure 1B:
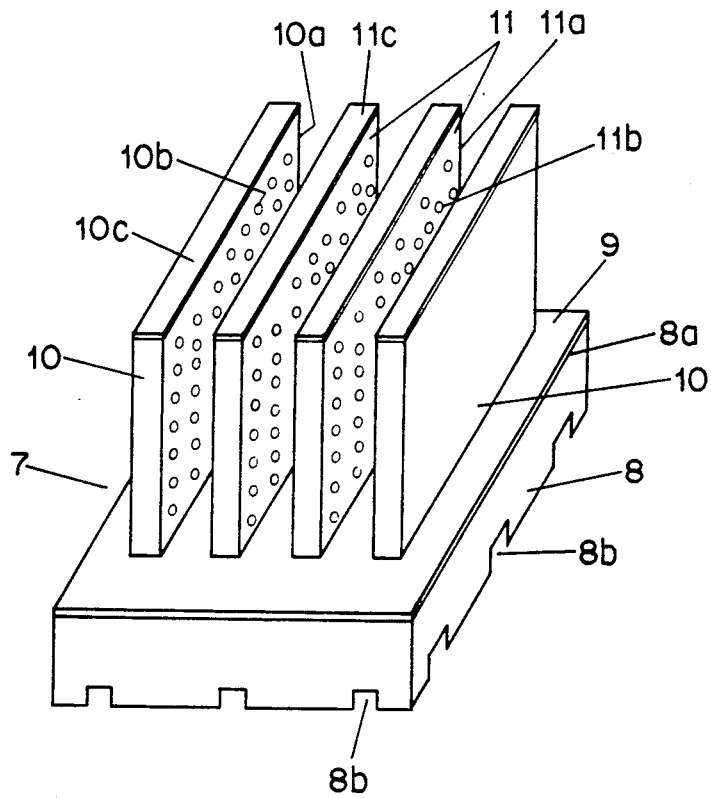
FIG. 1(b) is a perspective view of the placing table.
Figure 2:
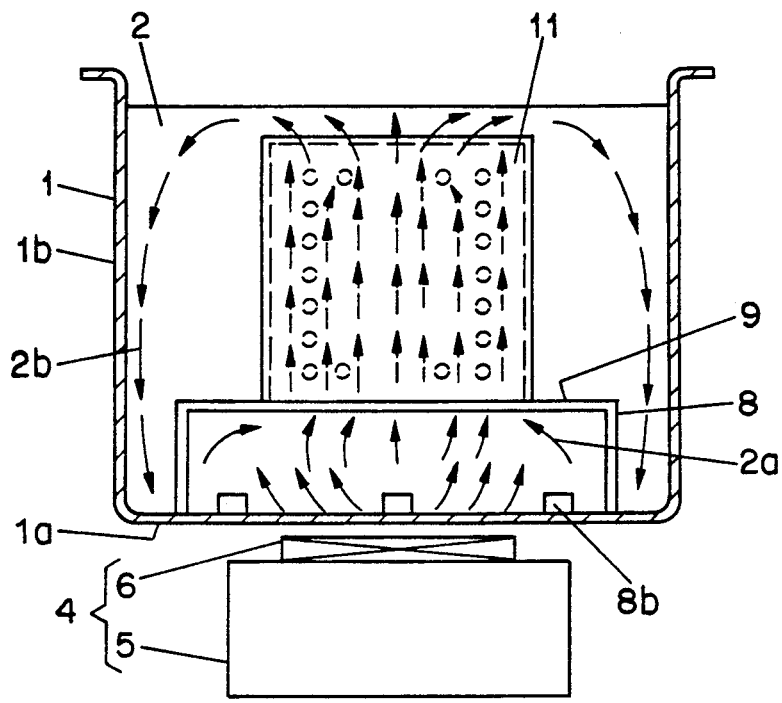
FIG. 2 is a lateral cross section of the present invention as viewed from the direction of arrow P in FIG. 1(a).
Figure 3:
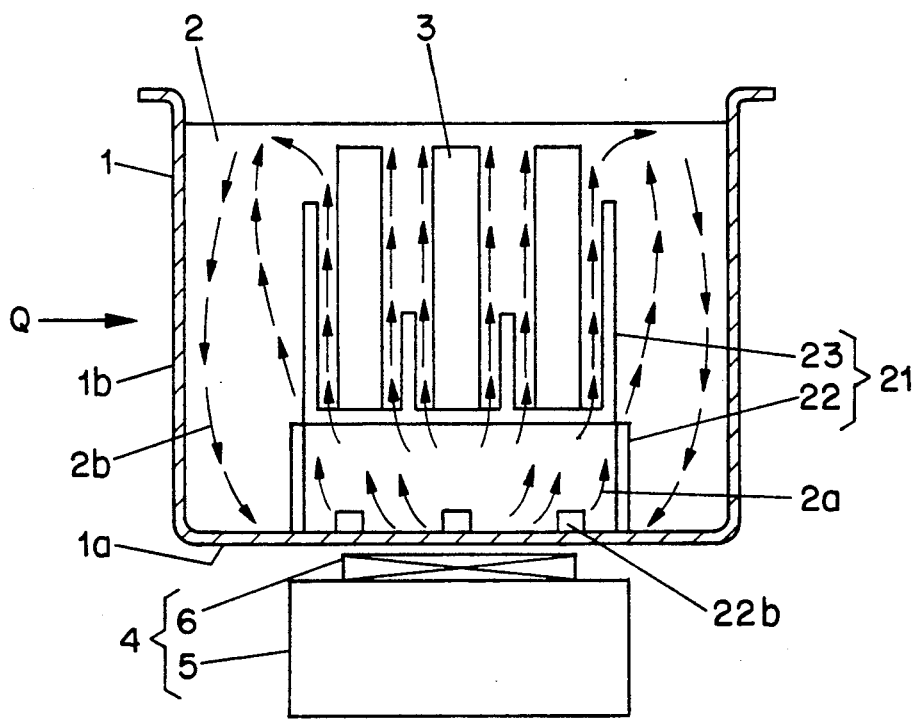
FIG. 3 is a lateral cross section of the conventional heating equipment for cold foodstuffs.
Figure 4:
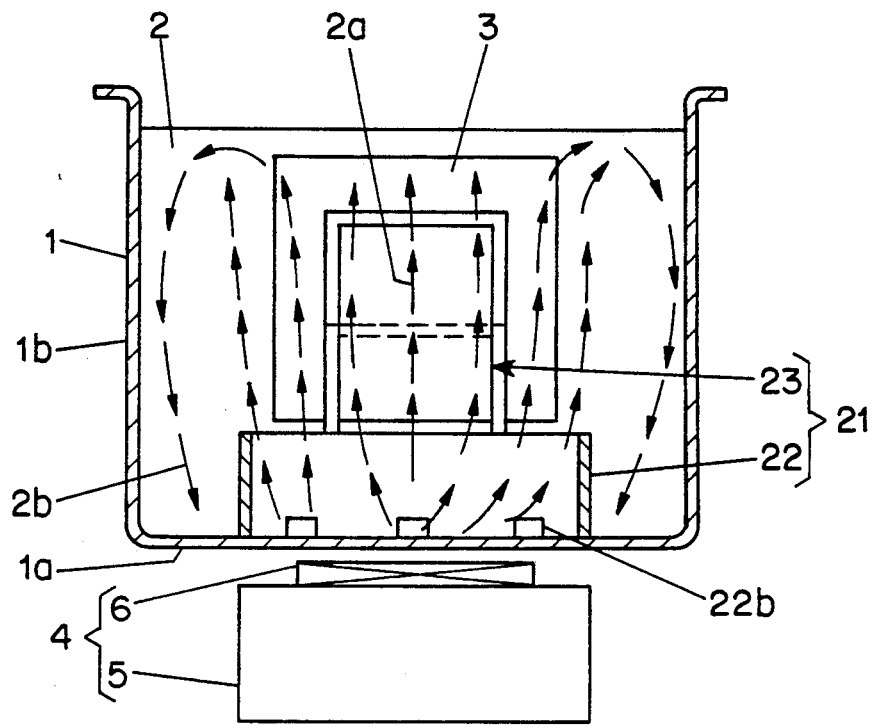
FIG. 4 is a lateral cross section of the conventional heating equipment as viewed from the direction of arrow Q in FIG. 3.
Figure 5:
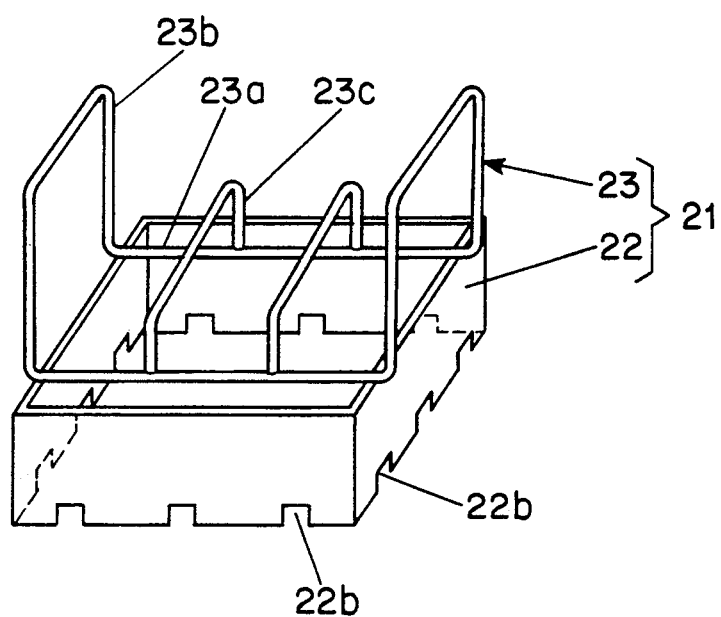
FIG. 5 is a perspective view of the placing table depicted in FIG. 3.

First embodiment: FIG. 1 shows one embodiment of the heating equipment for cold foodstuffs, FIG. 1(a) being a lateral cross section, FIG. 1(b) being a perspective view of a placing table used in FIG. 1(a), and FIG. 2 being a lateral cross section as seen from the direction of arrow P in FIG. 1(a). The parts identical with those of conventional heating equipment for cold foodstuffs shown in FIGS. 3 through 5 are given with the same numerals, and their explanations are omitted. The difference between the invention and the conventional equipment in FIGS. 1 and 2 is the construction of the placing table, with the placing table 7 consisting of a sidewall 8, a cover plate 9, a pair of cylindrical elements 10 for both ends, and intermediate cylindrical elements 11 disposed as required. The sidewall 8 has the same construction as the sidewall 22 of the placing table 21 in the conventional equipment, forming a rectangular parallelopiped cylinder that has both ends opened, and formed with throughholes 8b to facilitate the circulation flow 2b of said heating medium 2 on the lower part that makes contact with the bottom 1a of said container 1.

The cover plate 9 is a rectangular flat plate with the same shape as said sidewall 8, its periphery being sealed so that no liquid can penetrate said sidewall 8 and its top 8a covering the opening on the top 8a of the sidewall 8. The cover plate 9 is formed with various rectangular holes 9a in parallel to each other on the longer side of the cover plate 9, the longer side of each hole 9a being nearly the same size as the width of the larger sides of said cold foodstuff 3 packed in a rectangular parallelopiped container, and moreover, the spaces between the holes 9a being slightly larger than the thickness of the cold foodstuffs 3.

The cylindrical elements 10 for both ends and the intermediate cylindrical elements 11 are rectangular pallelopipeds with a rectangular cross section of the same shape as that for each of the holes 9a on said cover plate 9, with their lower ends sealed with each of the holes 9a so that no liquid can penetrate, and the shape of the sides 10a and 11a opposite the adjacent cylindrical element is a rectangular shape with nearly the same size as that of the side of the cold foodstuffs 3. A large number of discharge holes 10b and 11b are pierced and formed on the sides 10a and 11a. The tops of the cylindrical elements 10 for both ends and the intermediate cylindrical elements 11 are covered by blocking plates 10c and 11c and sealed so that liquid cannot penetrate the blocking plates 10c and 11c. The cylindrical elements 10 are disposed on the outermost sides among the cylindrical element groups 10 and 11, with the discharge holes 10b formed only on the side 10a opposite the other cylindrical element 10 or 11.

In the present invention, which has the construction described above, the upward flow 2a generated in the water, the heating medium 2, as a result of heating the center of the bottom 1a of the container 1 by using the heating means 4 rises along the sidewall 8, is collected into the holes 9a by the cover plate 9, enters into the cylindrical elements 10 and 11 through the respective holes 9a, and rises up inside the respective cylindrical elements 10 and 11. Since the upper ends of the cylindrical elements 10 and 11 are blocked by the block plates 10c and 11c, the upward flow 2a rises up inside the cylindrical elements 10 and 11 and jets out from the discharge holes 10b and 11b which are formed on the sides 10a and 11a of the cylindrical elements 10 and 11. As a result, a flow of the heating medium 2 colliding directly with the sides of cold foodstuffs 3 is generated because the upward flow 2a jets out from the discharge holes 10b and 11b and jets out horizontally from the cylindrical elements 10 and 11.

Furthermore, the flow of the heating medium 2 is generated nearly uniformly on the sides of the cold foodstuffs 3 because the shape of the sides 10a and 11a of the cylindrical elements 10 and 11 are nearly the same size as the shapes of the sides of the cold foodstuffs 3, and the discharge holes 10b and 11b are distributed opposite the entire face of each side of the cold foodstuffs 3. Moreover, as a result of the size of the space between the sides 10a and 11a and the cylindrical elements 10 and 11, and because the sides of the cold foodstuffs 3 are smaller than the space between the holes 9a disposed on the cover plate 9 connected to the cylindrical elements 10 and 11 and since the latter space is slightly larger than the thickness of the cold foodstuffs 3, the flow of heating medium 2 at a considerably high speed can be obtained on the surfaces of the sides of the cold foodstuffs 3. Therefore, the heat carried by the water as used the heating medium 2 is transferred to the cold foodstuffs 3 at a high efficiency to quicken the heating of the cold foodstuffs 3.

Furthermore, because the connection of the top of the upper end 8a of the sidewall 8 with the periphery of the cover plate 9 on the placing table 7, the connection of the holes 9a on the cover plate 9 with each of the cylindrical elements 10 and 11, and the connection of the cylindrical elements 10 and 11 with the blocking plates 10c and 11c are connected so that liquid cannot penetrate, the upward flow 2a jets out from the discharge holes 10b and 11b on the cylindrical elements 10 and 11 and there is no leakage. This increases the intensity of the flow of the heating medium 2 so that it directly collides with the sides of the cold foodstuffs 3, improving the transfer of heat possessed by the water as the heating medium 2 to the cold foodstuffs.

The upward flow 2a, which suffers a temperature drop as the flow rises, 2 changes its direction thereafter toward the sides 1b of the container 1 in the vicinity of top of the heating medium 2, descends along the sides 1b, flows through the throughholes 8b disposed on the sidewall 8 of the placing table 7, and returns to the center of the bottom 1a of the container 1 as in the case of conventional heating equipment.

While the discharge holes 10b and 11b formed on the sides 10a and 11a of each of the cylindrical elements 10 and 11 have been simply described as throughholes in prior explanations, the shape of the discharge holes 10b and 11b may be round, square, or a slit.

Furthermore, while the heating means 4 has been described as inductive heating equipment in prior explanations, the heating means should not be limited to such equipment, but rather can be an electric heater mounted directly on the center of the bottom 1a of the container 1 or disposed in proximity but apart from the center of the bottom 1a, or gas burning equipment to heat the center of the bottom 1a of the container 1, or otherwise anything that can be used to heat the heating medium 2 to the prescribed temperature by heating the center portion partitioned by the sidewall 8 of the placing table 7, and can generate the upward flow 2a which rises up from the center of the bottom 1a of the container 1 into the heating medium 2.

Figure 6:
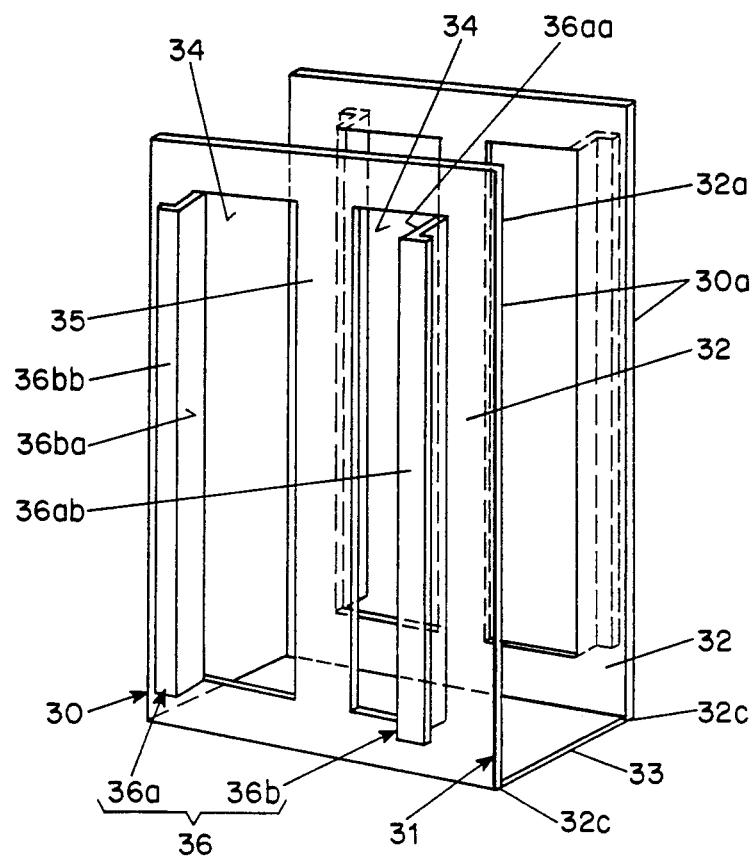
FIG. 6 is a perspective view of one embodiment of a support used in the heating equipment for cold foodstuffs of the present invention.
Figure 7:
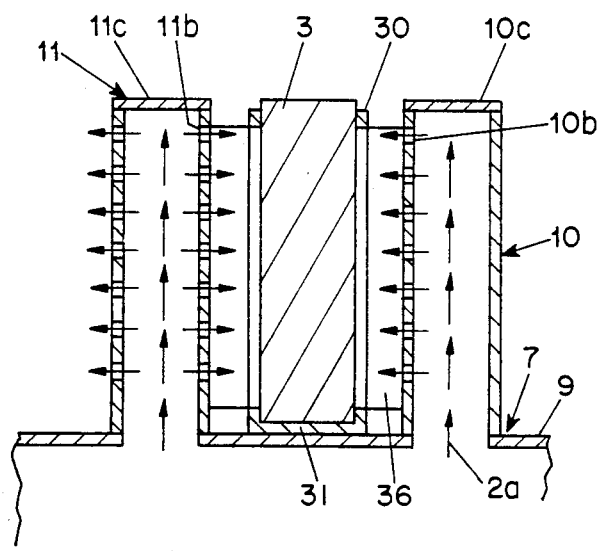
FIG. 7 is a lateral cross section of the major parts of the invention which show the support of FIG. 6 mounted on the placing table.

Second embodiment: FIG. 6 is a perspective view showing an embodiment of a support for the heating equipment for cold foodstuffs, and FIG. 7 is a lateral cross section of the major parts of the placing table when the support, shown in FIG. 6, is mounted on the placing table. The parts identical with those in the heating equipment for cold foodstuffs corresponding to claims 1 through 4 of the present invention shown in FIGS. 1 and 2 for the first embodiment, and the conventional heating equipment for cold foodstuffs shown in FIGS. 3 through 5 are given the same numerals, and their explanations are omitted. In FIGS. 6 and 7, a support 30 is used to support the cold foodstuffs 3, and is comprised of the U-shaped retaining piece 31 and spacing pieces 36, and is mounted removably between the cylindrical elements 10 or 11 on the placing table 7, the U-shaped retaining piece 31 being inserted with the cold foodstuffs 3.

The U-shaped retaining piece 31 is constructed in a U-shape by a pair of guide plates 32 made of thin plates arranged in parallel to each other in nearly an upright position disposed far enough apart to fit cold foodstuffs 3 between, and a linking plate 33 made of a thin plate to link each of the guide plates 32 at their lower ends 32c. Two throughholes 34 having a large area are disposed nearly at the center of each of the guide plates 32, and with a stopper 35 separating each pair of adjacent throughholes 34.

The spacing piece 36a and 36b is constructed with a single piece and is formed so that it protrudes from the vicinity of each of the edges 32a and 32b of each guide plate 32 in the direction of the guide plate's width, thus forming the space W between the outer sides of said guide plates 32 and the side of the cylindrical element 10 or 11. The spacing pieces 36a and 36b may be formed by bending part of the plate that constitutes the guide plate 32 when forming the throughholes 34 on the guide plate 32, and consisting of upright parts 36aa and 36ba that are parallel to edge 32a or edge 32b on the guide plate 32 and standing nearly upright from the side of the guide plate 32 with the height from the side of the guide plate 32 creating the space W, and the bent parts 36ab and 36bb formed being bent to nearly a right angle from the tips of each of the upright parts 36aa and 36ba.

Figure 8:
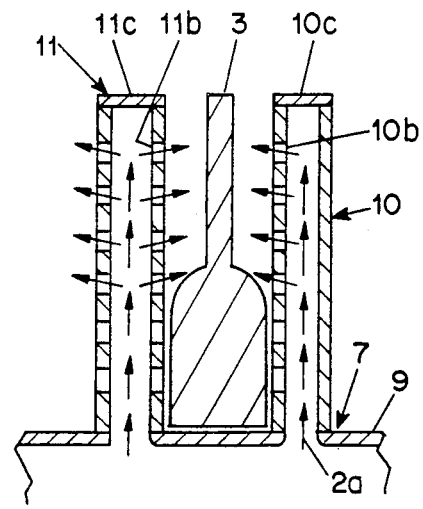
FIG. 8 is a drawing depicting the deformation of cold foodstuffs susceptible to deformation due to heating when it is heated using the heating equipment shown in FIGS. 1(a) and 1(b).

Some cold foodstuffs 3 may be subject to deformation because they become softened and more fluid as a result of a temperature rise due to heating. In the case where the cold foodstuffs 3 of this type are heated using the heating equipment for cold foodstuffs shown in FIG. 1 according to the first embodiment, the cold foodstuffs 3 move downward slowly as the temperature of these cold foodstuffs rises, with their width expanding at the lower part as shown summarily in FIG. 8. When such a condition occurs, the sides of the cold foodstuffs 3 can block the discharge holes 10b and 11b disposed at the lower part among the discharge holes 10b and 11b on the cylindrical element 10 or 11. Because no upward flow 2a in the heating medium 2 will jet out from the blocked discharge holes 10b and 11b, the cold foodstuffs 3 are heated unevenly and the amount of heating is reduced.

However, in the second embodiment which has the construction described above, the cold foodstuffs 3 are inserted and placed in the space 30a in the U-shaped retaining piece 31 and are heated by the upward flow 2a in the heating medium 2 that jets out from the discharge holes 10b and 11b. Since throughholes 34 with a large area are provided on the guide plate 32 in the U-shaped retaining piece 31, the heating medium 2 jets out from the discharge holes 10b and 11b and heats the cold foodstuffs 3 efficiently. The temperature of the cold foodstuffs 3 rises slowly due to heating, but even with cold foodstuffs 3 that are subject to deformation due to temperature rises, the thickness of the cold foodstuffs 3 cannot expand to more than the space 30a between the guide plates 32 because the thickness of the cold foodstuffs 3 is regulated by the guide plates 32 on the U-shaped retaining piece 31 or the stopper 35. Moreover, because the guide plates 32 and the side of the cylindrical element 10 or the side of the cylindrical element 11 retain the space W in this condition by means of spacing pieces 36 36a and 36b, the cold foodstuffs 3 cannot block the discharge holes 10b and 11b, while the heating medium 2 can continue heating the cold foodstuffs 3 in a stable condition. Therefore, even with cold foodstuffs 3 which are subject to deformation due to a temperature rise, quick and uniform heating can be carried out. The U-shaped retaining piece 31 makes contact with the side of the cylindrical element 10 or the side of the cylindrical element 11 with a relatively large area by the bent parts 36ab and 36bb. Hence it can maintain a stable mounting condition when the support 30 is placed on the placing table 7.

Although the second embodiment has been explained with respect to the stopper 35 being formed from the plate material that is used to construct the plate guide 32, as well as there as being one stopper formed vertically on the center of the guide plate 32, it 35 should not be limited only to such a construction. The stopper can also be a rod or other material, which comes in optional sizes and cross-sectional shapes, and can be arranged several at a time, or furthermore, can be a grid, for example. Anything that can prevent the cold foodstuffs 3 from expanding into the space W from the throughholes 34 even when the foodstuffs have become more susceptible to deformation due to a temperature rise may suffice.

While the second embodiment has been explained with respect to the spacing pieces 36 being formed from a plate material that is used to construct the plate guide 32, the spacing pieces 36 should not be limited only to such a construction, but rather any adequate material should be able to be used. It may suffice that any member that retains the space W is formed on the outer side of the guide plate 32. While the second embodiment has been explained with respect to the support 30 being mounted in a removable manner on the placing table 7, a support permanently fixed on the placing table 7 will do.

A summary of the construction of the placing table, as well as its effects on the heating of cold foodstuffs, will now be given in order to enable one skilled in the art to better appreciate the invention:

In the present invention, the heating equipment has a construction such that the placing table 7 has a sidewall 8, a cover plate 9, and cylindrical elements 10 and 11, said sidewall 8 being a rectangular cylinder with open upper and lower ends with discharge holes 10b and 11b to circulate said heating media 2; said cover plate 9 having the same rectangular shape as said sidewall 8, covering the top opening of the sidewall and having various rectangular holes 9a, all running parallel with each other on the longer side of the sidewall 8; said cylindrical elements 10 and 11 forming the same rectangular parallelopiped form as each of the holes drilled on said cover plate 9, being mounted onto each of the holes on said cover plate 9, the shape of the side facing the adjacent cylindrical element 10a and 11a being a rectangular form of nearly the same size as the side of the cold foodstuffs 3, with the upper end being blocked by the blocking plate 10c and 11c, and having, only on the side facing the adjacent cylindrical element 10a and 11a, a large number of discharge holes 10b and 11b to discharge the upward flow 2a of the heating media 2.

Thus, the upward flow 2a generated in the heating media 2 by heating the center of the container bottom 1a rises along the sidewall 8, is collected around the various holes by the cover plate 9, enters into the cylindrical elements 10 and 11 through the various holes, rises along the cylindrical elements 10 and 11, jets out from the discharge holes 10b and 11b drilled on sides of the cylindrical elements 10a and 11a in approximately horizontal directions, and generates a flow of the heating media 2, which collides directly with the sides of the cold foodstuffs 3. Thus the heat possessed by the heating media is transferred efficiently to the cold foodstuffs 3 while reducing the time required to heat the cold foodstuffs 3 to 60% to 70% of what had been conventionally required.

Also in the present invention, the heating equipment includes one or more support pieces 30 to support the cold foodstuffs 3 between the various cylindrical elements 10 and 11 disposed on the placing table 7, as well as to retain spaces between said foodstuffs 3 and said cylindrical elements 10 and 11. Each support has a U-shaped retaining piece 31 and spacing pieces 36; said U-shaped retaining piece 31 directly retaining the foodstuff 3 and allowing it them to stand approximately upright to the cylindrical elements 10 and 11 with spaces 30a provided so that the foodstuffs 3 can be inserted. The U-shaped retaining pieces 31 are constructed using a pair of guide plates 32 formed with throughholes 34 to circulate the heating media 2, and linking plates 33 to link each pair of guide plates 32 at their bottoms, the throughholes 34 being equipped with stopper pieces 35 to prevent the cold foodstuffs 3 from deforming during heating, the stopper pieces 35 being formed using part of said guide plate 32, said spacing pieces 36 forming spaces between said guide plates 32 and the cylindrical elements 10 and 11 disposed on the placing table 7, and being formed so that they protrude from the vicinity of the edges of each of said guide plates 32 in the direction of their width toward the outer side of each of said guide plates 32 in the said U-shaped retaining piece 31.

With these constructions, even when heating cold foodstuffs 3 susceptible to deformation due to softening caused by a temperature rise following such heating, the discharge holes 10b and 11b formed on sides of the cylindrical elements 10 and 11 will not be blocked by deformed foodstuffs 3 because the deformation of the cold foodstuffs 3 is regulated by the U-shaped retaining piece 31 in the support 30, and moreover, spaces are always retained between the cold foodstuffs 3 and the sides of the cylindrical elements 10a and 11a by means of the spacing pieces 36 in the support 31. Therefore, the heat of the water used as the heating media 2 is transferred to the cold foodstuffs 3 efficiently and evenly, and the time required to heat the cold foodstuffs 3 can be reduced even more than described earlier.

We claim:

1. Apparatus for heating foodstuffs contained in packages of parallelopiped shape comprising:
   a container having a sidewall and a bottom for containing a fluid heating medium;
   a box-like placing table supported within and upon the bottom of container, said placing table having sidewalls with throughholes along their lower edges, a cover plate sealed to the upper edges of said sidewalls and an open end opposite said cover plate and resting upon said container bottom, said cover plate having a plurality of rectangular openings therethrough disposed parallel to and spaced from each other a distance sufficient for a foodstuff package to fit therebetween;
   a like plurality of hollow, elongate cylinders each having an open first end and a closed second end, a rectangular cross-section corresponding to the shape of the rectangular openings in said cover plate and a height generally corresponding to the height of said foodstuff package when said package is placed on the placing table, said elongate cylinders being supported with vertical orientation with the open end of each sealingly fitted in a respective rectangular opening in said cover plate in communication with the interior of said table and defining an array of package-receiving spaces equal in number to said plurality less one, each rectangular side of the rectangular cylinders that faces the rectangular side of another rectangular cylinder having a multiplicity of discharge holes formed therein; and heating means disposed beneath said container for heating and causing flow of said fluid heating medium upwardly through said plurality of elongate rectangular cylinders, through said discharge holes and into contact with opposite side surfaces of foodstuff packages placed in the spaces defined by said array of rectangular cylinders for heating the same, and then back to the bottom of said container.

2. The apparatus of claim 1 wherein said fluid heating medium is water.

3. The apparatus of claim 1 further comprising means for preventing a heated foodstuff package from expanding and blocking the discharge holes in said rectangular cylinders, wherein said means comprises at least one support piece, each situated in one of the spaces defined by said array of rectangular cylinders, each support piece comprising:

a generally U-shaped retaining piece comprising two guide plates having dimensions substantially the same as the rectangular sides of the rectangular cylinders between which the support piece is situated, said guide plates having large throughholes which allow a nearly unimpeded flow of the heated heating medium through the guide plates, and a linking plate connecting said guide plates; and four spacing pieces, two on each guide plate parallel to one another and to the vertical edges of the guide plate, each situated near a vertical edge of said guide plate, and each extending out from the guide plate in the direction of the guide plate's thickness a predetermined distance such that the spacing pieces make contact with the rectangular cylinder sides and such that each guide plate is parallel to its adjacent rectangular cylinder side and is separated from the rectangular cylinder side by said predetermined distance.

4. The apparatus of claim 3 wherein each support piece is removably mounted on said placing table.

5. The apparatus of claim 3 wherein each support piece is permanently mounted on said placing table.

6. The apparatus of claim 3 wherein each of said spacing pieces is bent along the length of the piece at a right angle such that the portion of said spacing piece which is to make contact with an adjacent rectangular cylinder side is parallel to said adjacent rectangular cylinder side, whereby a more stable mounting condition is maintained.

7. The apparatus of claim 3 wherein said retaining piece has two large throughholes on each guide plate and said throughholes are separated by a stopper piece in the same plane as the guide plate which prevents the foodstuff from deforming during heating.

8. The apparatus of claim 7 wherein said spacing pieces are formed from the portions of each guide plate which are cut out to form said large throughholes, each of said portions being left attached along the edge of the throughhole closest to the vertical edge of the guideplate and being bent at a right angle to said guideplate.

9. The apparatus of claim 8 wherein each of said spacing pieces is bent along the length of the piece at a right angle such that the portion of said spacing piece which is to make contact with an adjacent rectangular cylinder side is parallel to said adjacent rectangular cylinder side, whereby a more stable mounting condition is maintained.

* * * * *